United States Patent [19]

van den Berg et al.

[11] 4,370,775
[45] Feb. 1, 1983

[54] MULTI-PURPOSE CONNECTOR

[75] Inventors: Johan H. van den Berg, Hasselt; Robert T. Le Sausse, Brussels, both of Belgium

[73] Assignee: Champion Spark Plug Europe, S.A., Virton, Belgium

[21] Appl. No.: 248,256

[22] Filed: Mar. 27, 1981

[30] Foreign Application Priority Data

Apr. 11, 1980 [FR] France ................ 80 08172

[51] Int. Cl.³ .............................. B60S 1/40
[52] U.S. Cl. ................................ 15/250.32
[58] Field of Search .............. 15/250.32–250.42

[56] References Cited

U.S. PATENT DOCUMENTS 3,757,377  9/1973  Hayhurst ............... 15/250.32
3,874,018  4/1975  van den Berg et al. ........ 15/250.32
4,057,869  11/1977 Longman et al. ............. 15/250.32
4,290,164  9/1981  van den Berg ............... 15/250.32

Primary Examiner—Peter Feldman
Attorney, Agent, or Firm—Wegner, McCord, Wood & Dalton

[57] ABSTRACT

In a connector (14,15) for connecting a wiper arm to a wiper blade, a pair of spaced apart attaching means (16,17) are provided for alternately attaching the connector to the wiper blade. Appropriately dimensioned slots (22a,22b) and surfaces (31,32,33,34,35,36,37,40,41) are provided on the connector to cooperate with bayonet-type arm ends (3a,3b) and hook-type arms ends (1a,1b, 2a,2b) for securing the appropriate arm end to the connector. One connector (14,15) is capable of accommodating at least six different arm ends.

17 Claims, 14 Drawing Figures

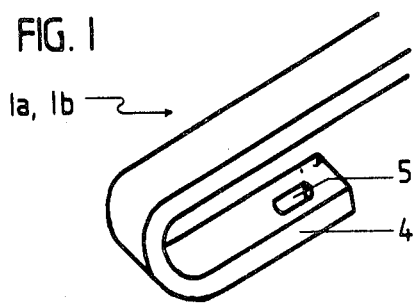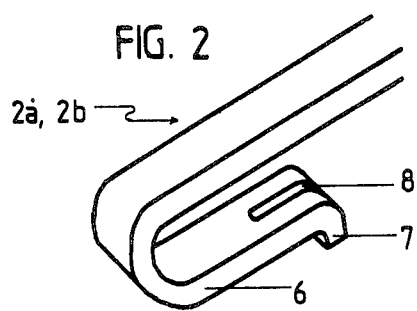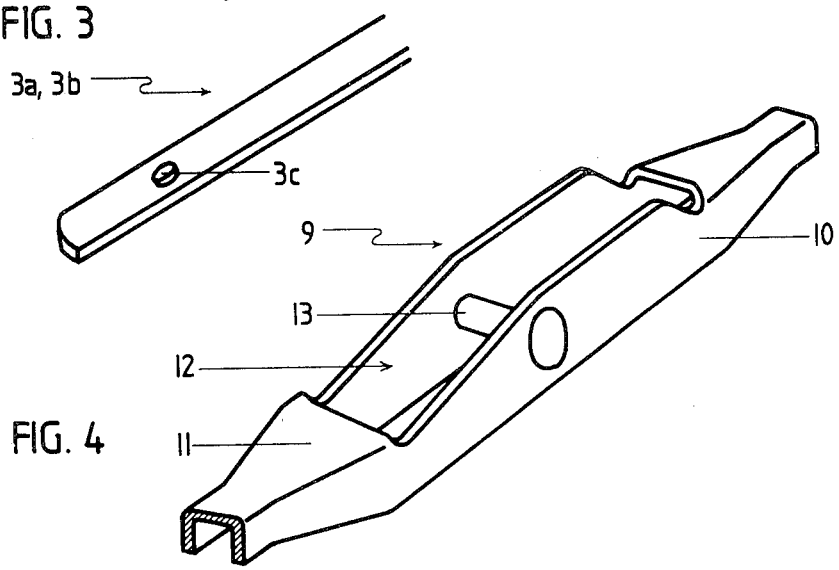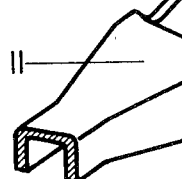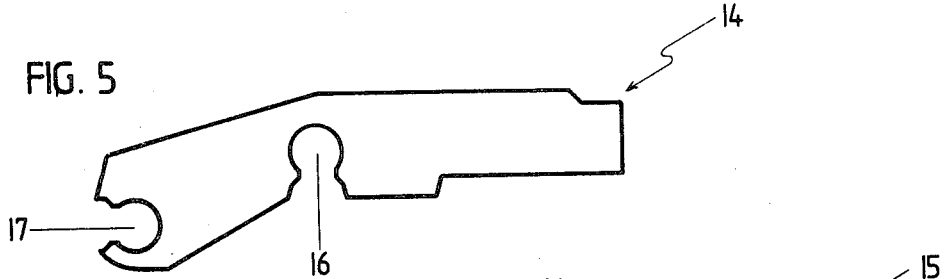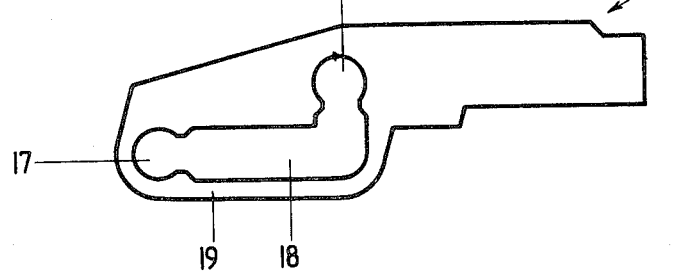

MULTI-PURPOSE CONNECTOR

DESCRIPTION

1. Technical Field

The present invention relates to a connecting device or connector for attaching a wiper blade to the free end portion of a corresponding wiper arm. Such assemblies are, for example, used in the motor vehicle industry for cleaning the windshields of cars, trucks, etc.

2. Background Art

Basically, any device for cleaning and wiping the windshields of motor vehicles generally comprises an oscillating wiper arm, a properly so-called wiper blade and a connecting device for pivotally attaching the superstructure of the wiper blade to the free end portion of the wiper arm.

According to a first classification of the connecting devices, a distinction may be made between: the connectors which are rigidly fixed to the wiper blade, but which can be removed from the wiper arm; the connectors which are rigidly fixed to the wiper arm, but which can be removed from the wiper blade; the connectors which can be fixed to and removed from the wiper blade as well as from the wiper arm.

According to a second classification of the connecting devices, a distinction may be made between: the connectors designed for a dorsal fitting, i.e. by means of which the wiper arm is attached on the top of the superstructure of the wiper blade and the connectors designed for a lateral fitting by means of which the wiper arm is attached laterally with respect to the superstructure of the wiper blade.

Lastly, a third classification of the connecting devices could be based on the configuration of the free end portion of the wiper arm. Indeed, there are many types of wiper arms on the market which all are provided with different free end portions. A wiper blade manufacturer producing for the replacement market, therefore, should theoretically manufacture, if not as many types of wiper blades, at least as many types of connectors as there are wiper arms on the market.

However, knowing that at least twelve different types of wiper arms are sold on the market and that most of them exist with two or sometimes with five different dimensions, it is easy to imagine the complications resulting from this situation, not only for the wiper blade manufacturer, but also for the dealers and the consumers. The first will have, indeed, to stock a large quantity of wiper blades and connectors in order to be able to follow the demand of the consumers, who, very often, are not able to make the right choice, more especially because on one and the same type of car, the type of the wiper arm may change from one year to the other.

It is therefore advisable, in the interest of the manufacturers, of the dealers, and of the consumers, to reduce as much as possible the number of connectors in manufacturing preferably multi-purpose connectors, i.e. connectors which may be used for selectively attaching to a given wiper blade, several wiper arms which either are of different types or have different dimensions.

Several multi-purpose connectors, capable of receiving either a bayonet-type arm or a hook-end arm, are already known in prior art. U.S. Pat. No. 4,057,869 to Longman et al, issued Nov. 15, 1977, German Pat. No. 2,410,595 to SWF, and French Pat. No. 2,116,821 to Journee Paul disclose such connectors, but they all have one or the other or all the following disadvantages:

- they can be used only with either a bayonet-type arm of one dimension or a hook-end arm of one dimension;
- the hook-end arm does not surround the pivot pin provided in the upper central portion of the superstructure of the wiper blade and, therefore, the possibilities of this type of arm are not used efficiently;
- they are designed in several parts, a fact which is always a disadvantage from a manufacturing, a cost, a sales, as well as from the user's point of view.

The present invention is directed to overcoming one or more of the problems as set forth above.

DISCLOSURE OF INVENTION

The present invention more particularly relates to a connector which, depending on the embodiment, is either removable from the wiper blade and from the wiper arm, or is unremovably fixed to the wiper blade, but removable from the wiper arm.

The two embodiments of the invention described in the present specification more especially relate to connecting devices designed for a dorsal fitting. However, by means of minimal modifications or even without any modification, these connecting devices may also be used as lateral connectors.

The technical problem that the present invention solves is thus to provide a multi-purpose connector which makes it possible to selectively attach a wiper blade to several wiper arms of different types and dimensions. The types of wiper arms, with which said multi-purpose connector may be used, are the following:

- the bayonet-type arms which have the form of a flat steel bar with a rectangular cross section and which are provided with a small locking detent at their upper surface;
- the hook-end type arms which, in fact, are of two sorts: in a first arm of this type the lower straight portion of the hook is provided with a rectangular opening (normal hook-end arm) and in a second arm of this type the lower straight portion of the hook is provided with a supplementary curvature as well as with a longitudinal slot (double curvature hook-end arm).

A first object of the invention is to provide a connecting device capable of being used with two types of wiper arms, i.e. the bayonet-type arms and the two sorts of the hook-end type arms.

A second object of the invention is to provide a connecting device capable of being used with at least two different dimensions of both of the two types and sorts of the above-mentioned arms, i.e. with six arms.

A third object of the invention is to provide a connecting device which, when taking into consideration that it can be used with six different arms, is of a very simple design and which, manufactured in one piece in an appropriate plastic material, is easy to mold and, therefore, rather inexpensive.

The connecting device according to the invention is more particularly characterized by the fact that it is provided, not with a single attaching means for its connection to said pivot pin of the superstructure of the wiper blade, but with two distinct and spaced apart attaching means, the first of these attaching means being used with the hook-end arms and the second of said attaching means being used with the bayonet arms.

Other characteristics and advantages of the invention will be more fully understood when reading the following description of two embodiments in conjunction with the accompanying drawings.

BRIEF DESCRIPTION OF DRAWINGS

FIG. 1 is a perspective view of a normal hook-end wiper arm;

FIG. 2 is a perspective view of a double curvature hook-end wiper arm;

FIG. 3 is a perspective view of a bayonet wiper arm;

FIG. 4 is a perspective view of the upper central portion of the superstructure of a wiper blade;

FIG. 5 is a side elevational view of the first embodiment of the connecting device according to the invention;

FIG. 6 is a side elevational view of the second embodiment of the connecting device according to the invention;

BEST MODE FOR CARRYING OUT THE INVENTION

Figure 7:
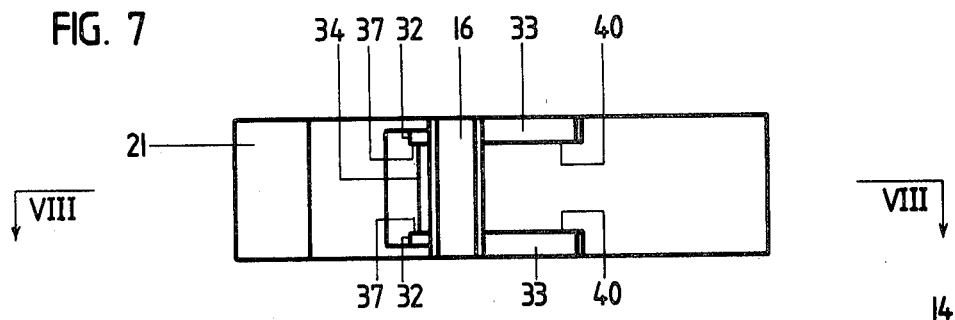
FIG. 7 is a bottom view of FIG. 5.

FIGS. 1 through 3 show the two types of wiper arms which may be attached to the connecting device according to the invention, i.e. the two sorts of hook-end arms of FIGS. 1 and 2 and the bayonet arm of FIG. 3. These three arms represent, in fact, six arms since each of them exists in at least two different dimensions. In the following portions of the specification, said six arms are designated as follows: 1a for the small normal hook-end arm, 1b for the large normal hook-end arm, 2a for the small double curvature hook-end arm, 2b for the large double curvature hook-end arm, 3a for the small bayonet arm, and 3b for the large bayonet arm. Arm 1a,1b has a lower straight portion 4 with a rectangular opening 5 therein. Arm 2a, 2b has a lower straight portion 6 with a downturned supplementary curvature 7. A slot 8 is formed in the supplementary curvature 7 and in the end portion of the lower straight portion 6.

FIG. 4 shows the upper central portion of the superstructure 9 of a wiper blade which generally comprises a central bridge in the form of an inverted "U" with a web 11, two flanges 10, a substantially rectangular opening 12 in the web 11 and a rivet or pivot pin 13 located between the two flanges 10.

FIGS. 5 and 6 show, in a side elevational view, the two embodiments 14,15 of the connecting device according to the invention, with the two attaching means 16,17 of said device being adapted for attachment onto the pivot pin 13 of the superstructure 9 of the wiper blade. In FIG. 6, the two attaching means 16,17 are linked together by means of a wall 19 defining an opening 18. In the first embodiment (FIG. 5), the connecting device 14 is of the type to be snap-fitted onto the pivot pin 13 and can be easily removed from said pin 13, i.e. from the superstructure 9 of the wiper blade. In the second embodiment (FIG. 6), the connecting device 15 is also of the type to be snap-fitted onto the pivot pin 13 but, because of the wall 19, it is no longer possible to completely remove it from the superstructure 9 of the wiper blade. In this case, the connecting device 15 is thus necessarily mounted on the wiper blade in the manufacturing plant.

The snapping attaching means 16,17 for pivotally mounting the connecting device onto the pivot pin 13 are features which are well-known in prior art and it is, therefore, not necessary to describe them in detail in the present specification.

Figure 8:
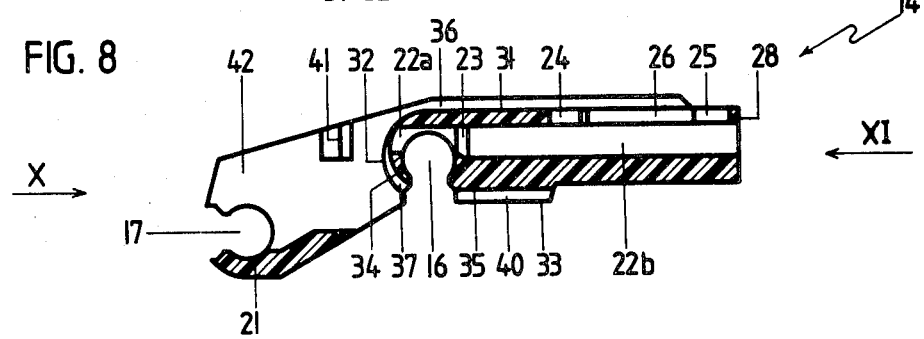
FIG. 8 is a sectional view along line VIII—VIII of FIG. 7.
Figure 9:
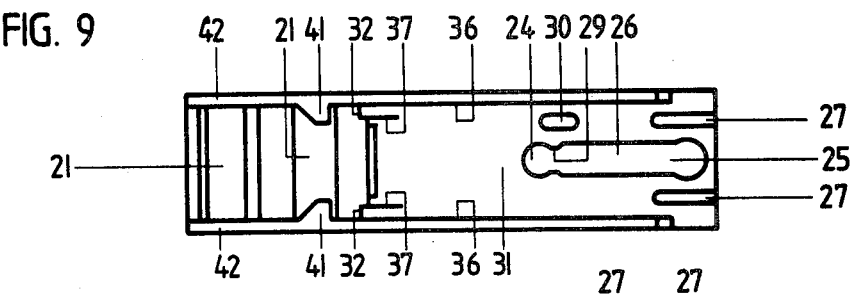
FIG. 9 is a top view of FIG. 8.
Figures 10, 11:
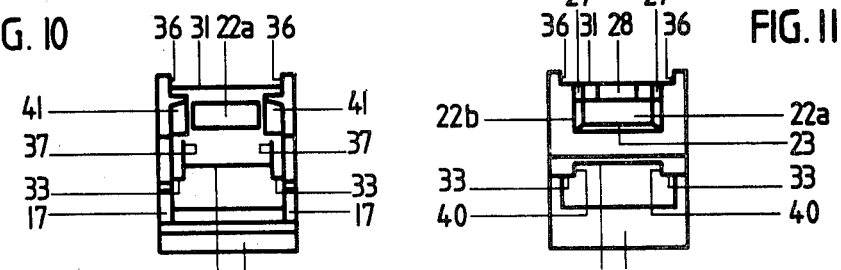
FIG. 10 is a side view along arrow X of FIG. 8.
FIG. 11 is a side view along arrow XI of FIG. 8.

FIGS. 7 through 11 show the first embodiment 14 of the connecting device according to the invention with, as already said above, first attaching means 16 and second attaching means 17 for pivotally mounting the connecting device onto the pivot pin 13, said two attaching means being completely independent (FIG. 8).

In order to attach the large bayonet arm 3b to the connecting device 14, according to this first embodiment, said device is provided with locking means comprising a slot 22b, the dimensions of which are adapted to the dimensions of said arm 3b, which, when inserted into said slot 22b, slightly raises the portion of the upper wall 31 which is located between the two small slots 27. As a matter of fact, it is the small detent 3c of the arm 3b which raises said portion of the upper wall 31 of the slot 22b and which subsequently snaps into the circular opening 25 of said upper wall 31. At this moment, the free extremity of the arm 3b reaches the point 23 where the cross section of the slot 22b is reduced and the arm 3b is thus perfectly locked in said slot 22b. In order to facilitate the insertion of the arm 3b into the slot 22b, a small inclined surface 28 may be provided at the free extremity of the portion of the upper wall 31 which is located between the two small slots 27. The small inclined surface 28 will indeed facilitate the snapping of the small detent 3c of the arm 3b into the opening 25 of the upper wall 31 of the slot 22b.

The small bayonet arm 3a is inserted into the slot 22a, the dimensions of said slot 22a being adapted to the dimensions of said arm 3a which, before entering into the slot 22a, passes through the slot 22b of the large bayonet arm 3b. The small arm 3a is introduced into the slot 22b in a slightly oblique position, its free extremity pointing upwards. In proceeding this way, the detent 3c of the small arm 3a passes easily beneath the free extremity of the upper wall 31 of the slot 22b and, when subsequently placing the small arm 3a into a horizontal position, the detent 3c snaps into the opening 26 which links the circular opening 25, corresponding to the detent 3c of the large arm 3b, to the circular opening 24 corresponding to the detent 3c of the small arm 3a. When the small arm 3a is subsequently pushed into the slot 22a, its detent 3c snaps into the circular opening 24 in overcoming the resistance of the resilient locking means 29. The resiliency of said locking means 29 is increased by means of a small elongate opening 30.

The connecting device, according to the invention, thus comprises a single slot for the two bayonet arms 3a,3b when, for example, compared to other multi-purpose connectors which comprise two separate and superposed slots, such separate slots having e.g. the disadvantage of substantially increasing the total volume of the connector.

According to the invention, it is thus possible to removably and selectively attach the connecting device 14 either to a first small bayonet-type arm 3a, or to a second large bayonet-type arm 3b. It is to be noted that when using the bayonet-type arms 3a,3b, the connecting device is pivotably attached to the pivot pin 13 of the superstructure 9 of the wiper blade by means of the second attaching means 17, so that said bayonet arms 3a,3b will be positioned above the superstructure 9 of the wiper blade.

For attaching one of the large hook-end arms 1b,2b to the connecting device according to the first embodiment of the invention, said device is provided with locking means which comprise flat and curved surfaces 31,33,32 cooperating with the inner surface of the hooks 1b,2b, said hooks being furthermore guided by the rigid lateral flat surfaces 36.

The same principle is used for the small hook-end arms 1a,2a, i.e. the flat surfaces 31,35 and the curved surface 34 cooperate with the inner surface of the hooks 1a,2a which are laterally guided by the flat surfaces 36,40.

The large hook-end arms 1b,2b, as well as the small hook-end arms 1a,2a, are maintained in their working position by lateral holding means 41 provided on the resilient portion 42 of the two lateral walls of the connecting device 14. When one of the hook-end arms 1b,2b, 1a,2a is being mounted on said flat and curved surfaces 31,33,35,32,34, the lateral holding means 41 resiliently spread aside for letting pass the curve of the hook 1b,2b, 1a,2a and then come back into their initial position, thus preventing any displacement of said arms 1b,2b, 1a,2a with respect to the connecting device 14.

In order to make sure that the front portion of the connecting device 14, i.e. the portion where the second attaching means 17 are positioned, is sufficiently rigid in spite of the fact that the upper portions 42 of the lateral walls are resilient, the lower portion of said front portion has been reinforced by a transverse wall 21.

Figure 12:
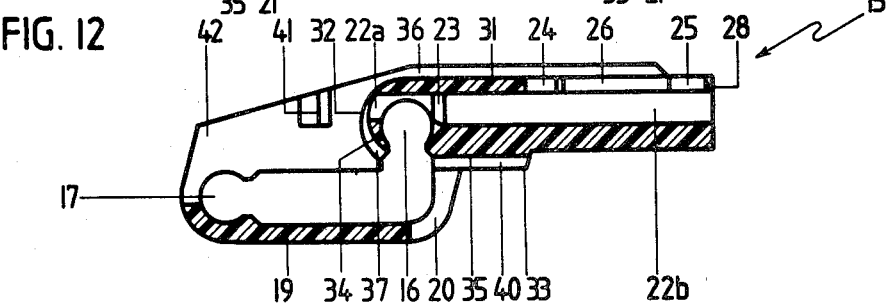
FIG. 12 is a sectional view similar to that of FIG. 8, but relating to the second embodiment of the invention.

According to FIG. 12, which shows the second embodiment of the invention, the locking means 31,32, 33,34,35,36,37,40,41 of the different wiper arms 1a,1b, 2a,2b, 3a,3b are exactly the same in the two embodiments. The only difference between the two embodiments is the fact that the two attaching means 16,17 are no longer completely independent in the second embodiment since, in FIG. 12, they are linked together by the transverse wall 19 which, towards the center portion of the device, is replaced by two lateral walls 20 in order to make possible the positioning of the hook-end arms 1a,1b, 2a,2b on said flat and curved surfaces 31,33,35,32,34.

Figure 13:
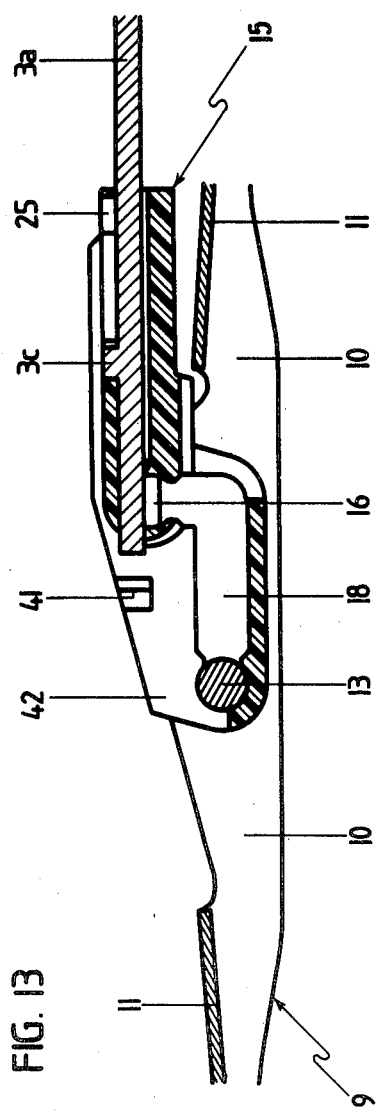
FIG. 13 is a sectional view, identical to the one of FIG. 12, the connecting device being represented in its working position with a bayonet arm.
Figure 14:
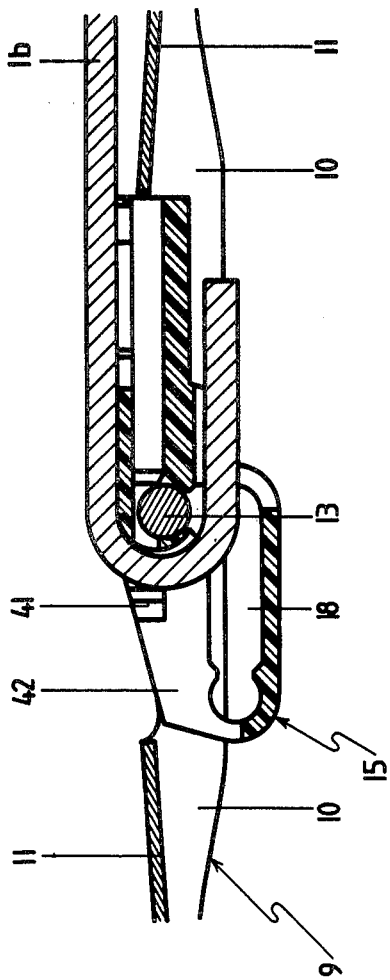
FIG. 14 is a sectional view, identical to the one of FIG. 12, the connecting device being represented in its working position with a hook-end arm.

FIGS. 13 and 14 show two wiper arms in their working position with respect to the connecting device 15: the small bayonet-type arm 3a is mounted on the second embodiment, with the second attaching means 17 snapped on the pivot pin 13 (FIG. 13) and the large hook-end arm 1b is mounted on the same second embodiment, with the first attaching means 16 snapped on the pivot pin 13 (FIG. 14).

INDUSTRIAL APPLICABILITY

The two embodiments disclosed in the present specification are not the only embodiments which may be manufactured, more especially with respect to the attaching means 16,17 which in the disclosed embodiments are of the snap-on type. Indeed, said attaching means may also consist of a cylindrical slot into which is inserted a pivot pin which is independent from the superstructure of the wiper blade. For example, such a pivot pin could consist of a normal screwbolt passing through the two flanges of the superstructure and through the cylindrical slot of the connecting device.

The three embodiments thus described may be used not only as dorsal connectors, but also as lateral connectors. In this case, the pivot pin is provided at its free end portion with a shouldering which is large enough to efficiently guide the connector. Just as in the preceding embodiments, the pivot pin associated with the lateral connector may either be independent or rigidly fixed to the superstructure of the wiper blade. If the pivot pin is independent, it will be locked in a known manner in the superstructure of the wiper blade, for example, by means of an appropriate resilient part which is inserted into the superstructure through the substantially rectangular opening 12.

Thus, the present invention is not limited to the embodiments shown and described. Various changes and/or modifications may be made without departing from the spirit and scope of the invention as defined in the appended claims.

Other aspects, objects and advantages of this invention can be obtained from a study of the drawings, the disclosure and the appended claims.

We claim:

1. A connecting device (14,15) for fitting a wiper blade selectively to a wiper arm of a first-type (3a,3b) or to a wiper arm of a second type (1a,1b, 2a, 2b) wherein the superstructure (9) of the wiper blade has a pivot pin (13) upon which said connecting vice (14,15) is fitted by means of first attaching means (16) connected to said pivot pin, characterized in that said connecting device further comprises a second spaced apart means (17) for being alternately attached to said pivot pin (13).

2. A device according to claim 1, characterized in that the first and the second attaching means (16,17) of the device (14,15) are of the snap-on type.

3. A device according to claims 1 or 2, characterized in that the first and second attaching means (16,17) of the device (15) are separated by an opening (18) through which said pivot pin (13) may pass from the first (16) to the second (17) attaching means and vice-versa.

4. A device according to claim 1, characterized in that said connecting device is provided with locking means for fitting to said connecting device either a bayonet-type wiper arm (3a,3b) or a hook-end type arm (1a,1b, 2a,2b).

5. A device according to claim 1, characterized in that said connecting device is provided with locking means for fitting to said connecting device either a first bayonet-type wiper arm (3a) of a given dimension, or a second bayonet-type wiper arm (3b) of another dimension.

6. A device according to claim 1 characterized in that said connecting device is provided with locking means for fitting to said connecting device either a first hook-end type wiper arm (1a,2a) of a given dimension, or a second hook-end wiper arm (1b,2b) of another dimension.

7. A device according to claims 4 or 6, characterized in that the hook-end type wiper arms (1a,1b, 2a,2b) are provided at the lower straight portion (4,6) of the hook either with a rectangular opening (5) or with a supplementary curvature (7) and with a longitudinal slot (8).

8. A device according to claim 5, characterized in that the locking means for the bayonet-type wiper arms (3a,3b) comprise a single slot (22a, 22b) the dimensions are adapted to the dimensions of the first wiper arm (3a) on one side of the device (14,15) and to the dimensions of the second wiper arm (3b) at the other side of the device (14,15).

9. A device according to claim 8, characterized in that an upper wall (31) of said single slot (22b) comprises two circular openings (24,25) of different diameters and separated by an elongate opening (26) having a width which is smaller than the diameter of at least one of the circular openings (24, 25).

10. A device according to claim 9, characterized in that one of the circular openings (24) comprises resilient locking means (29,30) on the side of said elongated opening (26).

11. A device according to claims 8, 9 or 10, characterized in that at the end portion of the single slot (22b) which corresponds to the wiper arm (3b) having the largest dimensions, the upper wall (31) of said slot (22b) is provided with two longitudinal slots (27).

12. A device according to claim 5, characterized in that the locking means for the hook-end type wiper arms (1a,2a, 1b,2b) comprise flat (31, 35,33) and curved (34,32) surfaces which exactly correspond to the inside surface of either the first hook-end type arm (1a,2a) or of the second hook-end type arm (1b,2b).

13. A device according to claim 12, characterized in that said locking means also comprise lateral holding means (41) provided on a resilient portion (42) of the two lateral walls of the device (14,15).

14. A device according to claim 12, characterized in that the two hook-end type wiper arms (1a,2a, 1b,2b) are laterally guided by flat, rigid surfaces (37,40,36), 15. A device according to claims 6 or 12, characterized by the suppression of said second attaching means (17) and by the suppression of the locking means for the bayonet-type wiper arms (3a,3b).

16. A device according to claims 5 or 8, characterized by the suppression of said first attaching means (16) and by the suppression of the locking means for the hook-end type wiper arms (1a,2a, 1b,2b).

17. A device according to claims 1 or 2, characterized in that said connecting device is made in one piece, for example, out of an appropriate plastic material.

* * * * *

UNITED STATES PATENT AND TRADEMARK OFFICE
CERTIFICATE OF CORRECTION

PATENT NO. : 4,370,775
DATED : February 1, 1983
INVENTOR(S) : Johan H. van den Berg and Robert T. LeSausse It is certified that error appears in the above-identified patent and that said Letters Patent are hereby corrected as shown below:

Claim 1, line 5, "vice" should be --device--

Signed and Sealed this

Tenth Day of May 1983

[SEAL]

Attest:

GERALD J. MOSSINGHOFF

*Attesting Officer*  *Commissioner of Patents and Trademarks*

UNITED STATES PATENT AND TRADEMARK OFFICE
CERTIFICATE OF CORRECTION

PATENT NO. : 4,370,775
DATED : February 1, 1983
INVENTOR(S) : Johan H. van den Berg and Robert T. LeSausse It is certified that error appears in the above-identified patent and that said Letters Patent are hereby corrected as shown below:

Cover page of patent, under Assignee,

Delete "Virton" and substitute therefor --Binche--

Signed and Sealed this

Fourteenth Day of June 1983

[SEAL]

Attest:

DONALD J. QUIGG

Attesting Officer  Acting Commissioner of Patents and Trademarks